United States Patent
Mies

(10) Patent No.: US 7,204,033 B2
(45) Date of Patent: Apr. 17, 2007

(54) DEVICE HAVING REMOVABLE PROBE SYSTEM AND MEASURING INSTRUMENT HAVING SUCH A DEVICE

(75) Inventor: Georg Mies, Wipperfürht (DE)

(73) Assignee: Klingelnberg GmbH, Huckeswagen (DE)

( * ) Notice: Subject to any disclaimer, the term of this patent is extended or adjusted under 35 U.S.C. 154(b) by 64 days.

(21) Appl. No.: 11/112,283

(22) Filed: Apr. 21, 2005

(65) Prior Publication Data
US 2005/0235512 A1 Oct. 27, 2005

(30) Foreign Application Priority Data
Apr. 23, 2004 (EP) .................. 04009675

(51) Int. Cl.
G01B 5/012 (2006.01)
G01B 21/04 (2006.01)
(52) U.S. Cl. .......................... 33/556; 33/503
(58) Field of Classification Search ................. 33/502, 33/503, 556, 557, 558, 559, 560, 561, 572
See application file for complete search history.

(56) References Cited

U.S. PATENT DOCUMENTS

| | | | |
|---|---|---|---|
| 5,028,901 A | 7/1991 | Enderle et al. | |
| 5,404,649 A | 4/1995 | Hajdukiewicz et al. | |
| 5,755,038 A | 5/1998 | McMurtry | |
| 6,012,230 A | 1/2000 | McMurty et al. | |
| 7,024,783 B2 * | 4/2006 | Trull et al. | 33/503 |

FOREIGN PATENT DOCUMENTS

| | | |
|---|---|---|
| DE | 33 20 127 C2 | 12/1984 |
| DE | 195 01 178 A1 | 6/1995 |
| DE | 197 21 015 C1 | 3/1999 |
| EP | 0 523 906 A1 | 1/1993 |
| WO | WO 03/083407 A1 | 10/2003 |
| WO | WO 03/087708 A1 | 10/2003 |

OTHER PUBLICATIONS

European Search Report No. EP 04 00 9675.

* cited by examiner

*Primary Examiner*—R. Alexander Smith
(74) *Attorney, Agent, or Firm*—McCormick, Paulding & Huber LLP

(57) ABSTRACT

Device having removable probe system and a stylus instrument. The probe system is connected to the stylus instrument in a zero position by the attractive force of the permanent magnet. A mechanical lever system is provided, which comprises a spring and, when the probe system is pulled out, transfers the probe system together with a part of the stylus instrument from the zero position into a replacing position through a displacement motion. At the same time, the permanent magnet is spatially separated from the probe system and the attractive force which acts between the probe system and the stylus instrument is reduced.

14 Claims, 4 Drawing Sheets

DEVICE HAVING REMOVABLE PROBE SYSTEM AND MEASURING INSTRUMENT HAVING SUCH A DEVICE

CROSS REFERENCE TO RELATED APPLICATIONS

The priority of European Patent Application EP 04 009 675.2 of Apr.23, 2004 is claimed, and the disclosure of the European Patent Application is incorporated by reference.

FIELD OF THE INVENTION

The present invention relates to devices having removable probe systems and measuring instruments having such devices.

BACKGROUND OF THE INVENTION

There are various measuring instruments which are equipped with a replaceable probe system. The replaceable probe systems are to be removable as rapidly and uncomplicatedly as possible.

One embodiment of a conventional measuring instrument has a probe system which may be connected by means of spring force to a stylus instrument. This connection is produced by hooking on a hook system. An active mechanism having a servomotor is provided in order to perform the placement and removal of the probe system.

There are also examples of probe systems which are attached to a stylus instrument of a measuring instrument using permanent magnets. In case of a collision of the probe system with a workpiece to be measured, for example, the probe system falls down in order to thus avoid damage to the stylus instrument. It must be put on again manually. A corresponding example is described in German Utility Model DE-GM 7400071.

A further measuring instrument is disclosed in U.S. Pat. Specification No. 5,755,038. The measuring instrument is distinguished in that it provides a probe system which is connected via permanent magnets to a stylus instrument. There is a small air gap between the magnets. The probe system may be separated from the stylus instrument by applying a force. No spring is employed. In order to be able to ensure a secure hold of the probe system, the magnets must ensure a specific minimum attractive force. However, this has the disadvantage that when the probe system is put on, it is attracted abruptly. In addition, a relatively large force must be applied for the separation. Therefore, removal of the probe system is relatively difficult.

A similar approach is described in PCT Application WO 03/087708. In this case, in addition to the permanent magnets which hold together the probe system and the stylus instrument, a damper is employed, which is seated either on the side of the probe system or on the side of the stylus instrument. The damper is designed in such a way that as the probe system approaches the stylus instrument, a hard collision is prevented by the damper effect, which deploys first.

An approach with magnetically coupled working modules is described in the POT application with publication number WO 03/083407 A. According to this document a system for reducing the clamping force is arranged externally to a changing station. The set up is so that the strong magnetic attractive forces have to be overcome only during an automatic changing process when removing the working module. When attaching the working module, the full magnetic force is acting and a damping occurs only if an automated changing process takes place in the external changing station An approach with magnetically coupled changing plate is described in the U.S. Pat. 6,012,230. A system for reducing the magnetic clamping force is situated in the changing plate. A reduction of the clamping force when removing the changing plate is ensured in connection with an automated changing process. In case of a manual changing process, the changing plate has to be grabbed in a specific manner and pulled, in order to actuate the mechanism for reducing the clamping force. When manually attaching it, the full magnetic force is applied too.

A further example of a measuring instrument having replaceable probe systems may be inferred from German Patent Specification DE 3320127 C2. A measuring instrument is described therein, whose probe system is attached using a combination of a permanent magnet and an electromagnet. The field of the electromagnet is superimposed on the field of the permanent magnet. An interchangeable plate having probe systems is pulled against a stylus instrument via a spring. The magnetic force of the permanent magnet may be briefly amplified by the electromagnet, or reduced by polarity reversal. When the interchangeable plate is put on the stylus instrument, there is an air gap between the permanent magnet and the interchangeable plate, due to which the magnetic attractive force is precisely large enough that the plate is attracted slightly by the stylus instrument. A spring is provided which holds back the permanent magnet. The magnetic force of the permanent magnet is increased in such a way by a current pulse that the spring force is overcome and the permanent magnet approaches the plate and finally presses against it. The plate is now pulled to the stylus instrument via the spring and there is no longer an air gap between the permanent magnet and the plate. To remove the plate, a current pulse is applied in the reverse direction, which reduces the magnetic force. The spring is now capable of pulling the permanent magnet away from the plate. An air gap thus arises and the plate may be removed—without having to apply large forces.

It is a disadvantage of the system that it has relatively large moving masses because of the electromagnet. In addition, cable connections to the mobile part of the stylus instrument are necessary in order to supply the coil of the electromagnet with power. A further disadvantage is that changing is only possible in the energized state. If a collision of the probe system occurs, relatively high forces arise on the stylus instrument, since the plate is held with the probe system on the stylus instrument by the spring force.

It is an object of the present invention to provide a device having a removable probe system, which allows automatic removal of the probe system to be performed. A further object of the present invention is to allow the simplest possible manual replacement of the probe system.

It is a further object to design a measuring instrument having a device having removable probe systems in such a way that a new calibration is not necessary after each replacement. In addition, damage to the stylus instrument is to be prevented.

In particular, the present invention is to achieve the object of improving a numerically controlled measuring instrument (CNC measuring instrument) in such a way that it has a simple and operationally reliable construction.

SUMMARY OF THE INVENTION

The object is achieved by a device having a removable probe system and a stylus instrument. The probe system (15)

is deflectable with multiple degrees of freedom and the stylus instrument generates signals which represent information about the deflection. The probe system is connected to the stylus instrument by the attractive force of a permanent magnet. The device has a mechanical lever arrangement. As the probe system moves through a displacement motion, the probe system including a part of the stylus instrument may be transferred into a replacing position and the permanent magnet may be spatially separated at the same time from the probe system by the mechanical lever arrangement. The attractive force which acts between the probe system and the stylus instrument is thus reduced. The object is also achieved in a measuring instrument incorporating the device.

Advantageous embodiments of the device according to the present invention are described in the specification.

BRIEF DESCRIPTION OF THE DRAWINGS

Exemplary embodiments of the present invention are described in greater detail in the following with reference to the drawings.

DESCRIPTION OF THE PREFERRED EMBODIMENTS

Terms are used in connection with the present description which are also used in relevant publications and patents. However, it is to be noted that the use of these terms is merely to serve for better understanding. The ideas according to the present invention and the scope of protection of the patent claims are not to have their interpretation be restricted by the specific selection of terms. The present invention may be transferred without anything further to other conceptual systems and/or professional fields. The terms are to be applied appropriately in other professional fields.

Figure 1:
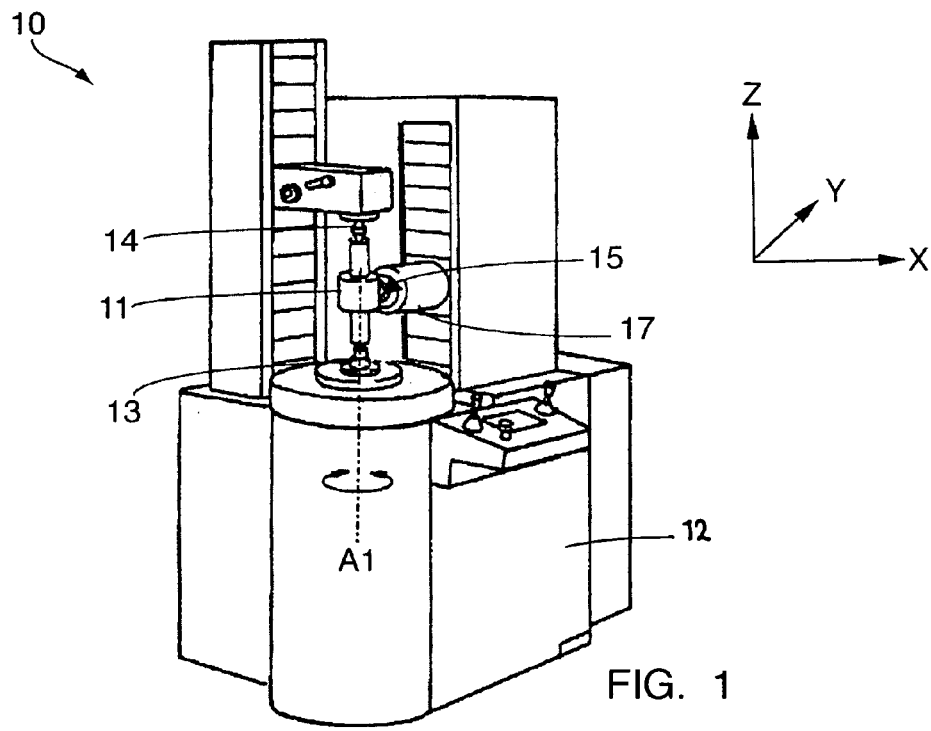
FIG. 1 shows a first measuring instrument according to the present invention.

An advantageous embodiment of the present invention, which is shown in FIG. 1, is directed to a fully automatic, CNC-controlled gear measuring instrument 10. The gear measuring instrument 10 is suitable for checking spur gear teeth as well as pinion and shaving cutters, worms and worm gears, hobbing cutters, bevel gears, and general size, dimensional, and positional deviations on rotationally symmetric workpieces, for curve and camshaft measurement, or even for rotor measurement, to list only a few possible uses.

The gear measuring instrument 10 comprises a dog 13 drivable via a controller 12 and a centering means 14, the dog 13 and the centering means 14 being positioned in such a way that a rotationally symmetric precision part 11 to be measured may be clamped coaxially between dog 13 and centering means 14, as shown in FIG. 1 on the basis of a spur gear 11.

The gear measuring instrument 10 comprises, as shown in FIG. 1, at least one probe system 15 for three-dimensional measurement (three-coordinate stylus instrument) of the precision part 11 clamped in the gear measuring center 10. A stylus instrument 17 whose height may be shifted is preferably provided, as indicated by the coordinate axis Z. In addition, the probe system 15 may execute further feed motions, as indicated by the perpendicular coordinate axes X and Y.

Figure 2:
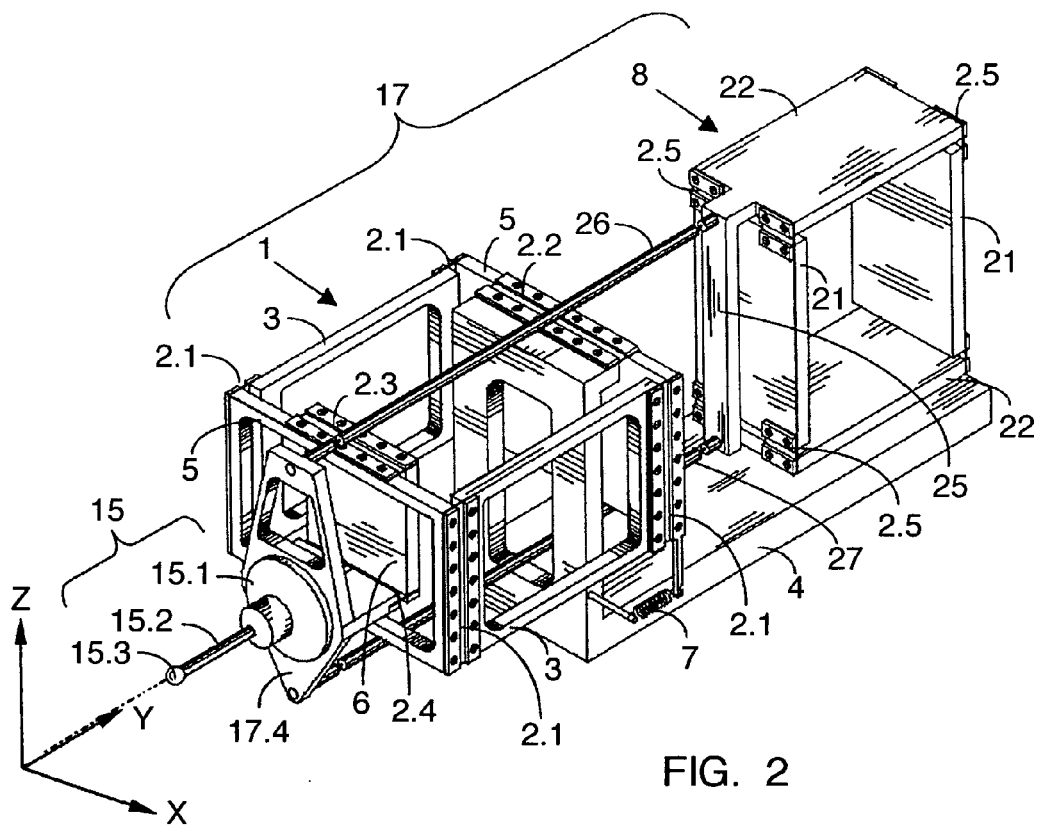
FIG. 2 is the schematic construction of a three-coordinate probe, having a horizontal main axis, of a second measuring instrument according to the present invention, the mechanical construction of the probe being illustrated disassembled somewhat for better visibility.

The sectional view of the stylus instrument 17 of a gear measuring instrument 10, which is constructed similarly to the stylus instrument 17 shown in FIG. 1, is shown in FIG. 2. Therefore, identical reference numbers are used. In the following, only the elements essential for understanding the present invention will be explained. Further details on such a gear measuring instrument 10 may be inferred, for example, from Patent Specification DE 19721015 (three-coordinate probe) or Published Application DE 19501178 (two-coordinate probe).

A stylus instrument 17 in horizontal construction is shown, which, as noted, is part of a numerically controlled gear measuring instrument 10 and is equipped with a sensing stylus 15.2, which may be deflected in multiple degrees of freedom parallel to itself and which is linked to a fixed probe base 4 via a multiple spring parallelogram systems positioned functionally perpendicular to one another. The deflections of the sensing stylus 15.2 are detected by three detectors attached to the probe base, which are not shown, however.

The probe shown in FIG. 2 has a probe system 15 and a stylus instrument 17. The stylus instrument 17 has an angular probe base 4, which is attached to the gear measuring instrument 10, which is not shown in greater detail. A first spring parallelogram 1 is movably suspended on a part of the probe base 4. It comprises elements 3 and 5, each two of which are equally long and positioned in pairs, which are connected to one another by four spring joints 2.1 having vertical axes and allow parallel shifts of the element 5 in the X direction. The first spring parallelogram 1 is suspended in such a way that the entire spring parallelogram 1 is pivotable around the horizontal axis of a further spring joint 2.2. An adjustable tension spring 7 ensures the required weight equalization, so that the first spring parallelogram 1 assumes a horizontal position when the probe is not deflected. The tension spring 7 is only shown schematically in FIG. 2.

A connection element 6 is provided between the first spring parallelogram 1 and the sensing stylus support 17.4. It is movably connected on one side to spring joints 2.3 parallel to the spring joint 2.2 at an upper edge of the element 5 and on the other side to a further spring joint 2.4 parallel to the spring joint 2.2 at a sensing stylus support 17.4. The sensing stylus support 17.4 is not yet sufficiently supported by this connection element 6, however. For this purpose, an additional two double-jointed rods 26 and 27, positioned with vertical spacing, which support themselves on a vertical bridge 25, may be attached to the sensing stylus support 17.4. The bridge 25 is assigned to a second spring parallelogram 8, which is formed by elements 21 and 22, each two of which are of equal length and are positioned in pairs, which are connected to one another by four spring joints 2.5 having horizontal axes. This second spring parallelogram 8 is attached by an element 22 on the probe base 4 in such a way that parallel shifts of the other element 22 in the y direction are possible. The vertical bridge 25 is attached to-this element 22. Using this arrangement, it is ensured that the sensing stylus support 17.4 may be deflected simultaneously in the X, Y, and Z directions and only shifts parallel to the longitudinal axis A2, because of which the length of the replaceable sensing stylus 15.2, including stylus ball 15.3, has no influence on the measurement result.

It may also be seen in FIG. 2 that the sensing stylus 15.2 is seated on a type of (interchangeable) plate 15.1. The plate 15.1 is attachable to the sensing stylus support 17.4 of the stylus instrument 17. The attachment occurs via a lever system according to the present invention, which is not shown in FIG. 2.

The gear measuring instrument 10 advances the stylus ball 15.3 vertically and radially to the workpiece 11 to be examined, the longitudinal axis A2 of the sensing stylus 15.2 having a horizontal position, and rotates the workpiece 11 at the same time until the stylus ball 15.3 contacts it at a predefinable point. To measure any arbitrary tooth topography, the curved tooth face of the workpiece 11 may be touched at any point in the normal direction. For this purpose, the probe system 15 may be deflected in all three coordinate directions X, Y, and Z of the space, as described above.

Such a contactless, incremental measurement arrangement registers all the deflections of the stylus ball 15.3 in the space defined by the three coordinate directions X, Y, and Z. If a two-coordinate stylus instrument is employed, deflections in only two coordinate directions are detectable.

The lever system according to the present invention is constructed and positioned in such a way that it holds the probe system 15 in a defined central position in the coordinate direction Y. The stylus ball 15.3 is deflectable out of this defined central position both in the positive and in the negative Y coordinate directions, depending on which side it comes into contact with the workpiece 11 from. A corresponding mechanical device is, as described for exemplary purposes on the basis of FIG. 2, mechanically connected via parallelogram systems 1 and 2 to the probe base 4. The precise mode of operation of this device may be inferred from Patent Specification DE 19721015 cited above.

The probe system 15 is extremely sensitive and it is important during rapid measurements that the probe system 15 does not collide with the workpiece 11 during motions in the space defined by the coordinate axes X, Y, Z or during motions of the workpiece 11 around the axis A1. In addition, another probe system 15 must be used depending on the measurement protocol.

Therefore, as already noted in the introductory part, replaceable probe systems 15 are preferably employed.

Figure 3A:
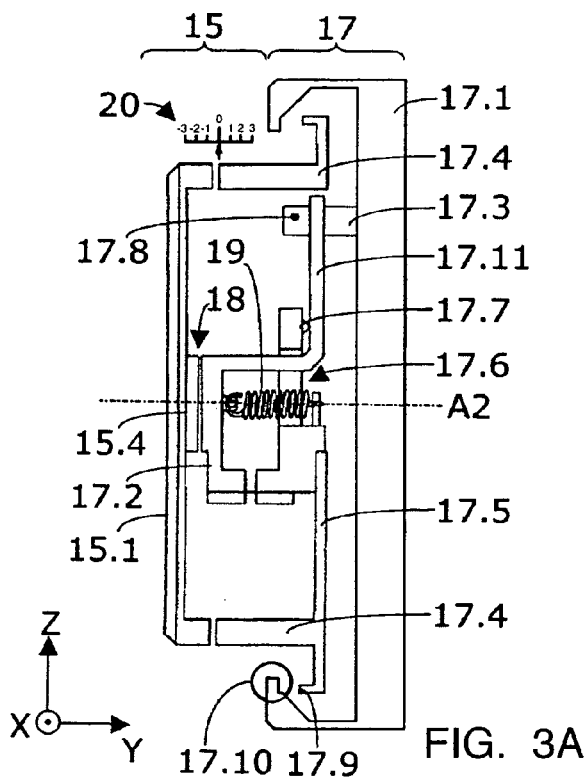
FIG. 3A is the schematic construction of a probe having a lever system according to the present invention, the probe being located in a zero position.

A first embodiment of the lever system according to the present invention may be inferred from FIGS. 3A–3J. These figures show a section through the front part of the stylus instrument 17 and the plate 15.1 in different positions. Further details of the probe system 15 itself are not shown in these figures. The stylus instrument 17 has, in the embodiment shown in FIGS. 3A–3J, a cylindrical connection region 17.1 on its front end, for example, which is illustrated as gray. This connection region 17.1 may, for example, be mechanically connected to the probe base 4. The probe system 15 comprises a plate-shaped element 15.1 (interchangeable plate), which is removable, as may be inferred from the sequence illustrated in FIGS. 3A–3J. The probe system 15 is connected to the stylus instrument 17 by the attractive force of a permanent magnet 15.4 in the zero position (FIG. 3A). A mechanical lever system is provided according to the present invention, as shown in the figures, which, when the probe system 15 is pulled out, transfers the probe system 15, with stylus instrument 17, into a replacing position through a displacement motion, separates the permanent magnet 15.4 spatially from the probe system 15 at the same time and thus reduces the attractive force which acts on the probe system 15. The transition from the zero position to the replacing position (also called front end position) is shown in FIGS. 3A through 3D.

The position of the permanent magnet 15.4 is preferably selected so that there is an air gap 18 between the magnet 15.4 and a lever element 17.2 of the stylus instrument 17, as may be seen in FIG. 3A. In the embodiment shown, the mechanical construction is implemented as follows. The connection region 17.1 is provided with at least one pin 17.3, which extends essentially parallel to the Y coordinate axis. The lever element 17.2 has a guide, in the form of a hole, for example, in order to be able to be displaced along the direction predefined by the pin 17.3. A cylindrical support element 17.4 is provided, which annularly encloses the lever system according to the present invention and other elements of the probe. The cylindrical support element 17.4 has an inwardly projecting extension 17.5, which extends essentially parallel to the Z coordinate axis. The extension 17.5 has a recess 17.6 to guide a leg of the lever element 17.2 through or along. In addition, the extension 17.5 is provided with a stop 17.7 for the lever element 17.2 in the exemplary embodiment shown. An elastic element 19 (a tension spring in the present example) is positioned between the extension 17.5 and the lever element 17.2, for example. In the example shown, the elastic element 19 extends essentially parallel to the axis A2, which does not necessarily have to be so. In the zero position, indicated in FIG. 3A by the zero setting of the scale 20, the plate 15.1 is solidly connected, via the lever arrangement having the lever element 17.2, the extension 17.5, and the cylindrical support element 17.4, to the stylus instrument 17 by the forces originating from the magnet 15.4. The lever system having the lever element 17.2, the extension 17.5, and the cylindrical support element 17.4 forms a mechanically stable unit in the zero position (measurement position), which is movable in solidarity with the plate 15.1 along the direction predefined by the pin 17.3. The plate 15.1 is suspended in such a way, as described in connection with FIG. 2, for example, that deflections are detectable by the gear measuring center 10.

Figure 3B:
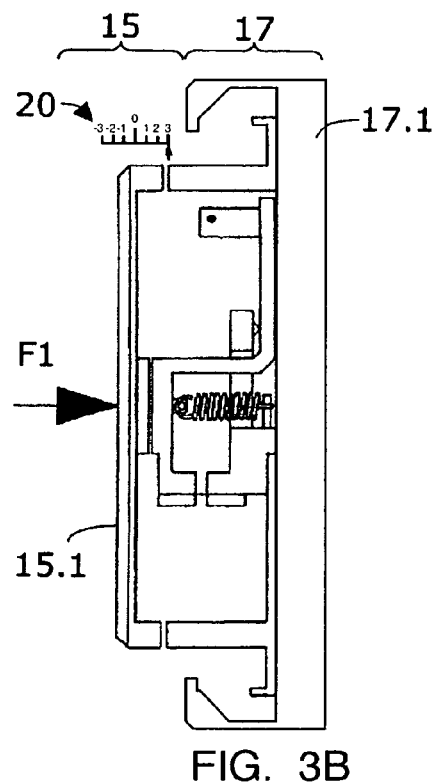
FIG. 3B shows the probe having the lever system according to FIG. 3A, the probe being located in a rear end position.

Through the exemplary embodiment shown, the movement direction in the direction of the positive Y coordinate axis is larger than in the −Y direction. Therefore, as shown in FIG. 3B, an optional collision protection may be implemented, which behaves as follows. If too large a limiting force F1 occurs, which acts in the +Y direction via the stylus ball 15.3 and the sensing stylus 15.2 on the plate 15.1, the entire lever system having the probe system 15 is shifted toward the connection region 17.1 until it is seated there. This position, which is shown in FIG. 3B, is referred to as the rear end position. It is simultaneously the rear delimitation of the measurement range of the stylus instrument 17, as shown on the basis of the scale 20.

Figure 3C:
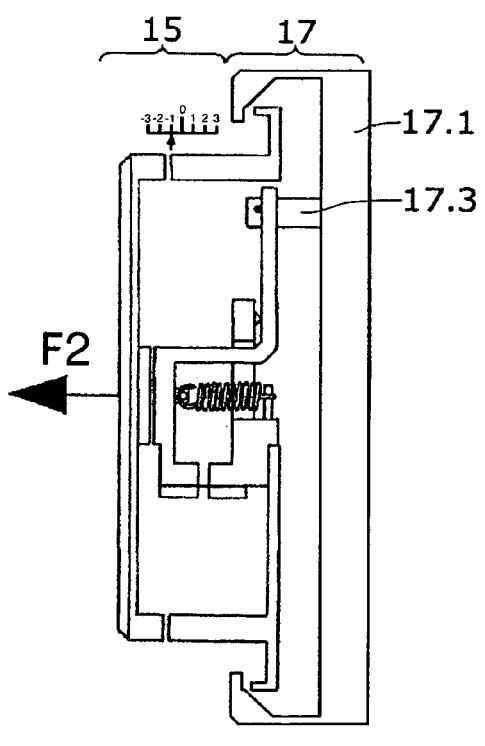
FIG. 3O shows the probe having the lever system according to FIG. 3A, the probe being located in a starting position for levering out.
FIG. 3D shows the probe having the lever system according to FIG. 3A, the probe being located in a front end position.
FIG. 3E shows the probe having the lever system according to FIG. 3A, the probe having been removed and the stylus instrument being locked.
FIG. 3F shows the probe having the lever system according to FIG. 3A, the probe having been put on again.
FIG. 3G shows the probe having the lever system according to FIG. 3A, the probe having been shifted into the zero position together with the stylus instrument.
FIG. 3H shows the probe having the lever system according to FIG. 3A, the probe having been shifted together with the stylus instrument in proximity to the rear end position.
FIG. 3I shows the probe having the lever system according to FIG. 3A, the probe having been coupled to the stylus instrument again.
FIG. 3J shows the probe having the lever system according to FIG. 3A, the probe again being located in the starting position.

The stylus instrument 17 also has a front delimitation of the measurement range, which is shown in FIG. 3C. This delimitation position is assumed if a force F2 acts in the −Y direction on the probe system 15 and displaces the entire lever system in the direction of the −Y axis. A stop 17.8 is provided on the pin 17.3, which sets one end of the movement in solidarity of the entire lever system. The front delimitation of the measurement range is reached in FIG. 3C. A further parallel displacement in solidarity along the pin 17.3 is no longer possible. The measurement range is thus delimited in the negative deflection direction. The scale 20 has reached the position −1 in the example shown. In the embodiment shown, this front delimitation of the measurement range is simultaneously the starting position for the mechanical levering out according to the present invention via the lever system. Between the rear end position and the front delimitation, the lever system according to the present invention is essentially displaced in solidarity with the probe system 15, without elements of the lever system inclining, rotating, or shifting in relation to one another.

Figure 3D:
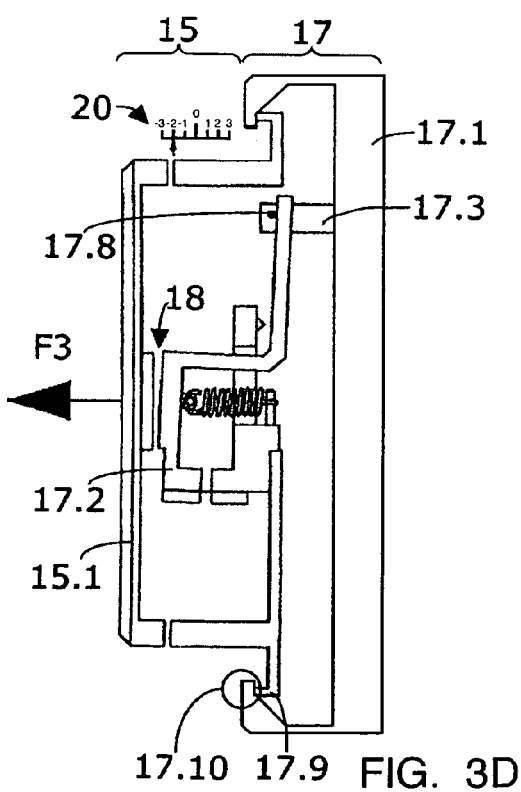

The levering out will be described on the basis of FIGS. 3C through 3E. If a force F3, with F3>F2, acts on the probe system 15, as shown in FIG. 3D, the lever element 17.2, which is attracted by the magnetic force, attempts to follow this motion. The lever element 17.2, which presses against the stop 17.8 of the pin 17.3, remains back and the air gap 18 is enlarged until the front end position shown in FIG. 3D is reached (the scale 20 is now at −2, for example). Because of the enlarged air gap, only a reduced force still acts between the stylus instrument 17 and the plate 15.1. The plate 15.1, including sensing stylus 15.2 and sphere 15.3, may now be removed relatively easily. For this purpose, only a force F is necessary, which is less than the force F in FIG. 3C, for example. Since a peripheral collar 17.9 of the support element 17.4 presses against a stop region 17.10 of the connection region 17.1, however, the support element 17.4, including elastic element 19 and lever element 17.2, may not complete any further motion in solidarity in the −Y direction.

Figure 3E:
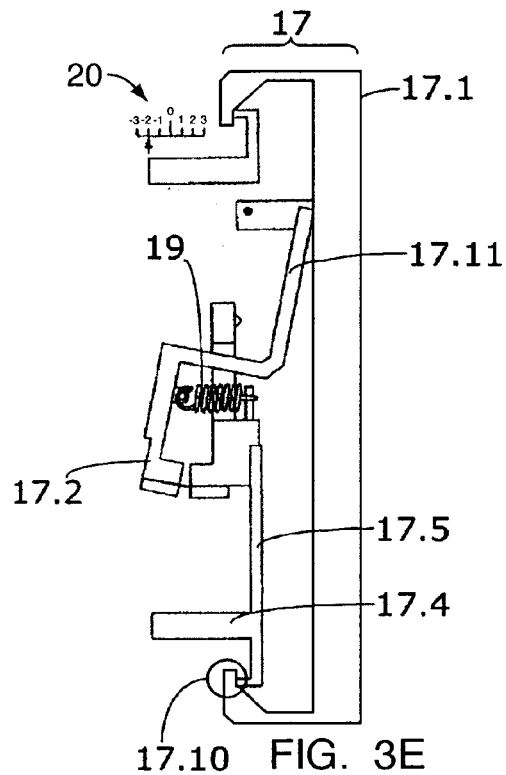

A corresponding image is shown in FIG. 3E. There, the stylus instrument 17 is shown without the plate 15.1. The stylus instrument 17 is held in the front end position via the lever system according to the present invention. This is performed in the example shown, for example, in that the lever element 17.2 is tilted by the elastic element 19 in relation to the extension 17.5. An arm 17.11 of the lever element 17.2 is supported against the connection region 17.1 and presses the lever system in the −Y direction against the stop region 17.10 of the connection region 17.1. The support element 17.4 is thus additionally locked in the X and Z directions in the connection region 17.1. This is advantageous since otherwise the stylus instrument 17 would deflect in the Z direction because of the missing weight of the plate 15.1.

Figure 3F:
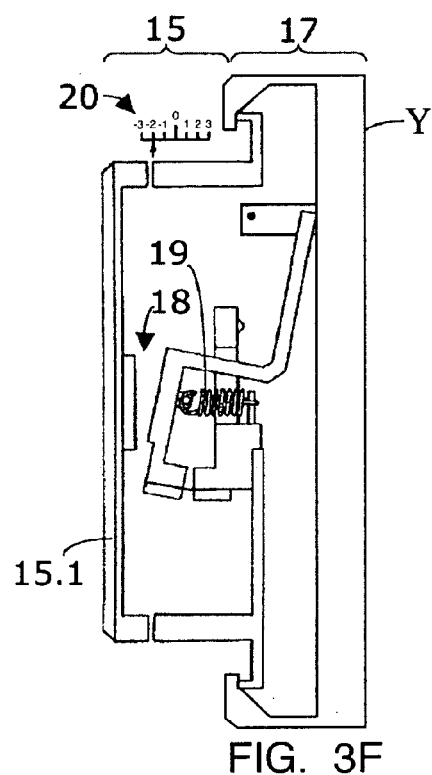
Figure 3G:
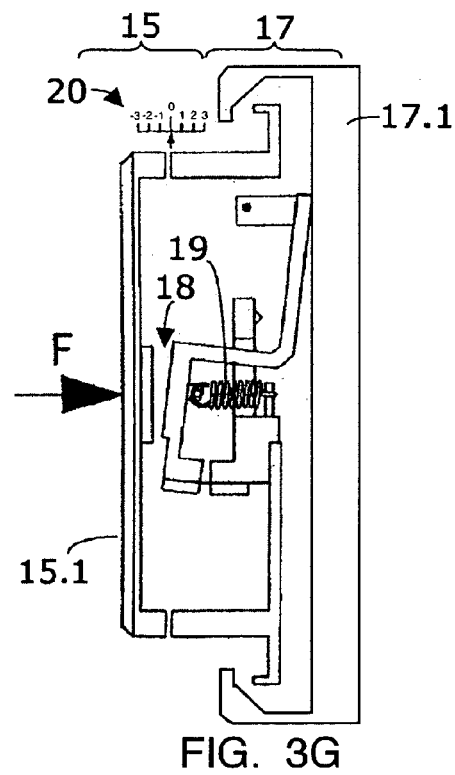

The plate 15.1 is put on again in FIG. 3F. The air gap 18 is again relatively large and only a slight magnetic attractive force acts. The plate 15.1 thus only snaps very softly against the lever system of the stylus instrument 17. The stylus instrument 17, including the lever system, is again located in the front end position. The plate 15.1, including the lever system, is only shifted into the zero position (see scale 20) and the air gap 18 is reduced at the same time when a force F is pressed against the plate 15.1 in the +Y direction (see FIG. 3G). The restoring force of the spring 19 is still sufficient to hold the lever system in a set-back position.

Figure 3H:
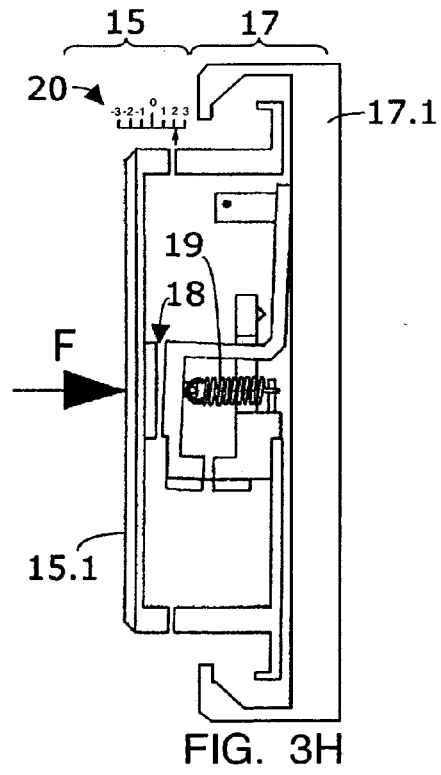
Figure 3I:
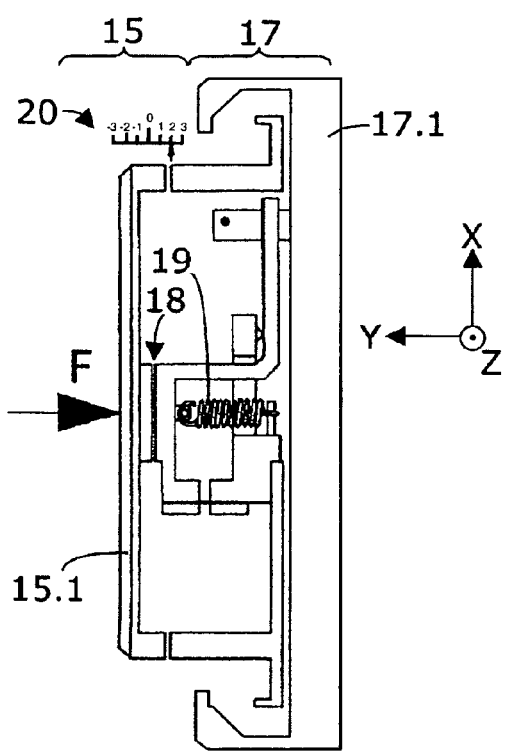
Figure 3J:
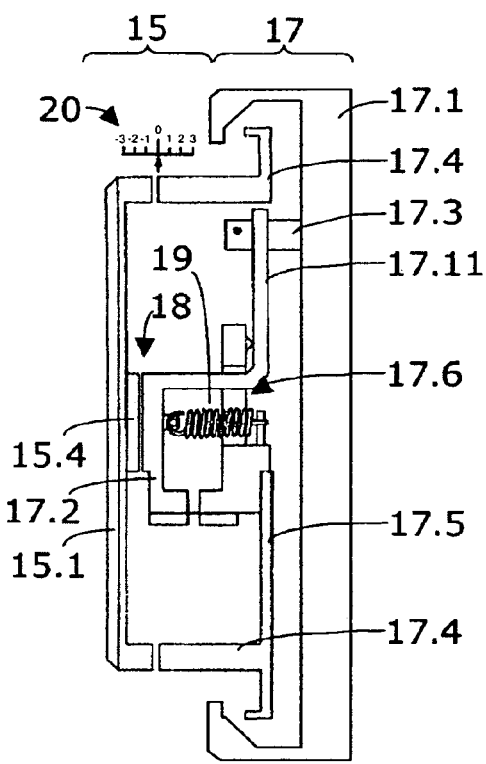

If the plate 15.1, including the lever system of the stylus instrument 17, is shifted in closer proximity to the rear end position, as shown in FIG. 3H, the magnetic force becomes larger than the force of the spring 19 and the lever element 17.2 is pulled toward the plate 15.1. In the example shown, this transition occurs at a position between 2 and 3 on the scale 20. In FIG. 3I, a position is shown in which the plate 15.1 is coupled to the stylus instrument 17. If the force F disappears, the entire system returns back into a zero position (measurement position), which is shown in FIG. 3J.

The stylus instrument 17 having the probe system 15 is mechanically connected to a measuring center (such as the gear measuring center 10) in such a way that the probe system 15 may be deflected with multiple degrees of freedom and the stylus instrument 17 generates signals which represent information about the deflection. The signals may be generated optically, for example. However, strain gauges and/or other elements may be used in order to convert motions into signals. Further details of the gear measuring instrument 10 are not shown in the figures.

In an alternative embodiment, the permanent magnet is positioned on the side of the stylus instrument 17, i.e., it is not a part of the removable plate 15.1. Multiple magnets may also be provided.

In a preferred embodiment of the present invention, a tensile force F2 is to be applied to transfer the probe system 15 from the zero position into the replacing position, which causes a spatial separation of permanent magnet 15.4 and probe system 15. Through the spatial separation of permanent magnet 15.4 and probe system 15, a tensile force F3 is to be applied, when removing the probe system 15 in the replacing position, that is less than the attractive force (also called retaining force) which acts in the zero position between the permanent magnet 15.4 and the probe system 15.

The retaining force in a gear measuring instrument 10 is typically between 10 and 50 N. An embodiment in which the retaining force is between 15 and 25 N is especially preferred. Through the mode of operation of the lever system according to the present invention, the force F3 which is necessary for removing the plate 15.1 in the replacing position is reduced and is typically 20% to 50% of the retaining force. The force F3 to be applied for removal is a function of the retaining force, and also of the arrangement of the individual elements of the lever system. By increasing the lever arm of the lever system, the force F3 which is necessary to remove the plate 15.1 may be reduced.

In a preferred embodiment of the present invention, an integrated, mechanical collision protection is provided to protect the stylus instrument 17. This collision protection may preferably be implemented as follows. The mechanical lever system is designed in such a way that it may be shifted in solidarity with the probe system 15 in the direction of the stylus instrument 17. If a limiting force F1 occurs, the probe system 15 is pushed together with the lever system against a stop in order to thus ensure the collision protection. Exemplary details in this regard may be inferred from FIG. 3B. Such a collision protection is optional.

The mechanical lever system is preferably designed in such a way that a front delimitation of the measurement range of the measuring center is predefined by a delimitation means 17.8. This delimitation is optional. There are various methods and possibilities for implementing such a delimitation means.

The present invention is distinguished in the special embodiment shown in FIGS. 3A through 3J in that the mechanical lever system is designed in such a way that if a tensile force F is applied, which acts on the probe system 15 in the negative Y coordinate direction, a displacement of the probe system 15, together with the lever system, occurs in solidarity, this displacement in solidarity ending after covering a first section and a further application of a tensile force F2 triggering activation of the lever system. The permanent magnet 15.4 is first spatially separated from the probe system 15 by this activation of the lever system. This type of the embodiment is especially advantageous since, when pulling on the system, one feels that the end of the first section has been reached and that the separation is now being initiated. This embodiment is intuitive to operate and offers protection against impermissible loads or strains if it is combined with an optional lock.

In a preferred embodiment, an air gap 18 is provided between the permanent magnet 15.4 and a diametrically opposite metallic plate. An air gap 18 between 0.1 and 0.5 mm width has proven itself. When the probe 15, including stylus instrument 17, is transferred into the replacing position, the width of the air gap 18 is preferably increased by 100% to 200% by the effect of the lever system.

The first section which is covered during the displacement from the zero position into the replacing position is preferably between 1 and 2 mm. The section which must be covered in order to achieve the separation of the probe system 15 from the stylus instrument 17 is preferably less than 5 mm and, in an especially preferred embodiment, is in the range from 1 mm to 3 mm.

The lever system preferably comprises a spring 19 as an elastic element, or a combination of multiple elastic elements, which cause a lock.

An embodiment is preferred in which, for example, the lever element 17.2 of lever system presses backward (i.e., in the positive Y coordinate direction) against a part of the stylus instrument 17 in order to lock the lever system after the probe system 15 was removed, a restoring force exerted by a spring 19 as the elastic element preferably pressing the lever element 17.2 forward (in the –Y direction) against the edge of the stylus instrument 17. Such a lock is optional.

The lever arrangement is preferably implemented in such a way that the probe system 15—or another probe system having compatible construction of the plate 15.1—is attachable to the stylus instrument 17 in that a pressure force F presses against the probe system 15 in order to reduce the spatial separation of permanent magnet 15.4 and probe system 15.

In another preferred embodiment, the lever system is implemented in such a way that the removal of the permanent magnet is triggered by a force which is directed in the X and/or Z direction. In such embodiments, it is also advantageous to first provide a displacement of the probe 15.1 in solidarity in a direction in order to thus transfer the probe 15.1 into a replacing position. Only after overcoming this replacing position is the removal of the permanent magnet triggered using the lever system according to the present invention.

A probe typically comprises, as shown in FIGS. 1 and 2, a removable probe system 15 and a guide system, which is a part of the stylus instrument 17. The guide system may be housed in a cylindrical housing, which is mainly used for protecting the sensitive mechanism. In addition to the exemplary parallelogram guide system shown in FIG. 2, there are also numerous other possibilities for producing a mechanical coupling between the probe system 15 and the measuring instrument.

The present invention may be used both in measuring instruments 10 having switching probes, and in measuring instruments 10 having measuring probes, as described in DE 3320127 C2, for example.

In a preferred embodiment, the device according to the present invention is a machine tool or a coordinate gear measuring instrument, which is equipped with a device for automated probe replacement. Either a robot arm is provided, which aligns a probe in relation to the stylus instrument 17 and moves by applying a pressure force to the lever system until the attractive force of the magnet 15.4 is sufficient to attract the probe system 15. Alternatively, the stylus instrument 17 may be implemented in such a way that it may be moved on a magazine or the like in order to receive a probe system 15 there. For this purpose, the stylus instrument 17 is pressed with a sufficient force against a probe system 15 mounted in the magazine until the attractive force of the magnet 15.4 is sufficient to reliably hold the plate 15.1 of the probe system 15. The stylus instrument 17, including probe system 15, may then be moved into a position in which a measurement may be executed.

Work cycles to be executed manually may thus be dispensed with partially or entirely. An automated achievement of the object of this type is possible, since according to the present invention the removal and attachment of a probe system 15 on the stylus instrument 17 only makes relatively simple movement sequences necessary.

In the measuring instruments, probe systems in horizontal construction are primarily used, as shown in FIGS. 1 and 2. There are also measuring instruments, however, in which probes in suspended or standing construction are used. The present invention may, of course, also be used in a measuring instrument having a suspended or standing stylus instrument 17, the magnetic force having to be designed in such a way that the removable plate holds securely in the different positions.

If the stylus instrument 17 is executed more precisely, calibration of the measuring center after replacing the probe system 15 may be dispensed with. Calibration may be performed from time to time, however; in order to avoid measurement imprecisions.

It is an advantage of the different embodiments according to the present invention that relatively high retaining forces may be implemented using simple means. The handling is relatively simple, since a significantly reduced attractive force occurs when putting on and removing the plate 15.1. An embodiment having an automated changer is especially advantageous. Furthermore, it is advantageous that replacing the probe system 15 is possible with only one hand, since no switch, button, or lever must be actuated. In addition, it is advantageous that the moved mass is less than in conventional achievements of the object. It is also viewed as an essential advantage that in the event of a collision, the retaining force falls strongly with increased air gap. Damage may thus be avoided. It is also advantageous that no cable must be led to the probe system 15 or to the separating region, since the system operates passively.

What is claimed is:

1. A device having a removable probe system, a permanent magnet, and a stylus instrument that includes a probe base and a mechanical lever arrangement, said device generating signals which represent information about a deflection of the probe system, the probe system being connectable to the stylus instrument by an attractive force of the permanent magnet and being separable from the stylus instrument by the lever arrangement, characterized in that:

the probe system is connected to the probe base by first and second spring parallelogram systems arranged functionally perpendicularly to one another so that the probe system is deflectable with multiple degrees of freedom; and prior to a removal of the probe system through a displacement motion thereof, the probe system, may be transferred into a replacing position wherein the lever arrangement increases an air gap proximate the permanent magnet for reducing the attractive force which acts between the probe system and the stylus instrument, to facilitate the removal of the probe system from the stylus instrument.

2. The device according to claim 1, characterized in that the lever arrangement comprises one or more elastic elements.

3. The device according to claim 2, characterized in that a lever element of the lever arrangement presses backward against a part of the stylus instrument in order to lock the lever arrangement after the probe system has been removed, a restoring force exerted by the elastic element pressing the lever element against the part of the stylus instrument.

4. The device of claim 2 wherein the one or more elastic elements are configured for locking the lever arrangement when the probe system is attached to the stylus instrument.

5. The device according to claim 1, wherein:

the magnet is attached to one of the probe system and the stylus instrument, said air gap lying between the magnet and the other of said probe system and said stylus instrument to which the magnet is not attached; and due to the air gap a tensile force that is less than the attractive force is to be applied when removing the probe system in the replacing position.

6. The device according to claim 1, characterized in that the mechanical lever arrangement is displaceable in solidarity with the probe system, the probe system, including the lever arrangement, striking against a stop if a limiting force occurs, in order to thus offer a collision protection.

7. The device according to claim 1, characterized in that the mechanical lever arrangement is designed in such a way that a front delimitation of a measurement range of the stylus instrument is predefined by a delimitation means.

8. The device according to claim 1, characterized in that the mechanical lever arrangement is designed in such a way that if a tensile force which acts on the probe system is applied, the probe system, including the lever arrangement, is displaced in solidarity, this displacement in solidarity ending after covering a first section and a further application of a tensile force triggering an activation of the lever arrangement and thus spatially separating the permanent magnet from the probe system.

9. The device according to claim 8, characterized in that a lever element of the lever arrangement is tilted and spatially separates the permanent magnet from the probe system upon activation.

10. The device according to claim 1, characterized in that the probe system or another probe system is attachable to the stylus instrument, wherein a pressure force presses against the probe system to reduce a spatial separation between the permanent magnet and the probe system.

11. The device according to claim 10, characterized in that the probe system is displaceable into a rear end position by applying the pressure force.

12. A multiple coordinate measuring instrument comprising:

a device having a removable probe system and a stylus instrument, the probe system being connected to the stylus instrument by the attractive force of a permanent magnet, wherein a mechanical lever arrangement is provided and, as the probe system moves through a displacement motion the probe system, is transferred into a replacing position and the permanent magnet spatially separated from one of the probe is system and the stylus instrument by the mechanical lever arrangement whereby the attractive force which acts between the probe system and the stylus instrument is reduced for facilitating removal of the probe system from the stylus instrument;

and wherein the stylus instrument includes first and second spring parallelogram systems arranged functionally perpendicularly to one another so that the probe system is deflectable with multiple degrees of freedom.

13. A multiple coordinate measuring device comprising:

a stylus instrument having a lever arrangement; and a probe system removably connected to the stylus instrument by way of an attractive force of a magnet attached to one of the probe system and the stylus instrument; wherein:

the stylus instrument includes first and second spring parallelogram systems arranged functionally perpendicularly to one another for deflection of the probe system with multiple degrees of freedom; and the probe system is separable from the stylus instrument by the lever arrangement, wherein upon transference of the probe system into a replacing position the lever arrangement increases a spatial separation between the magnet and the other of said probe system and said stylus instrument to which the magnet is not attached, thereby facilitating removal of the probe system from the stylus instrument.

14. The device of claim 13 wherein:

the lever arrangement comprises a lever element and an elastic element attached to the lever arrangement; and the lever element presses backward against a part of the stylus instrument in order to lock the lever arrangement after the probe system has been removed, a restoring force exerted by the elastic element pressing the lever element against said part of the stylus instrument.

* * * * *

UNITED STATES PATENT AND TRADEMARK OFFICE
CERTIFICATE OF CORRECTION

PATENT NO. : 7,204,033 B2
APPLICATION NO. : 11/112283
DATED : April 17, 2007
INVENTOR(S) : Georg Mies It is certified that error appears in the above-identified patent and that said Letters Patent is hereby corrected as shown below:

Column 11, Claim 1, Line 15, please delete the "," after the word "system".
Column 12, Claim 12, Line 21, please add a --,-- after the word "motion".
Column 12, Claim 12, Line 21, please delete the "," after the word "system".
Column 12, Claim 12, Line 25, please add the --,-- afte the word "arrangement".
Column 12, Claim 12, Line 22, add the word --is-- after the word "magnet".
Column 12, Claim 12, Line 23, please delete the word "is" after the word "probe".

Signed and Sealed this

Tenth Day of July, 2007

JON W. DUDAS
*Director of the United States Patent and Trademark Office*